United States Patent
Kaltenbach et al.

(10) Patent No.: US 8,239,110 B2
(45) Date of Patent: Aug. 7, 2012

(54) METHOD FOR TREATMENT OF A DRIVELINE

(75) Inventors: Johannes Kaltenbach, Friedrichshafen (DE); Notker Amann, Friedrichshafen (DE); Alexander Banerjee, Oberteuringen (DE); Christian Mittelberger, Ravensburg (DE); Mesut Er, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 348 days.

(21) Appl. No.: 12/694,404

(22) Filed: Jan. 27, 2010

(65) Prior Publication Data
US 2010/0217508 A1 Aug. 26, 2010

(30) Foreign Application Priority Data
Feb. 20, 2009 (DE) .......................... 10 2009 001 034

(51) Int. Cl.
*B60T 7/12* (2006.01)
*B60T 7/00* (2006.01)

(52) U.S. Cl. .......................... 701/76; 701/78; 303/114.3
(58) Field of Classification Search .................... 701/54, 701/70, 76, 78, 112, 113; 123/179.4, 179.3; 303/114.3
See application file for complete search history.

(56) References Cited

U.S. PATENT DOCUMENTS

| 4,064,694 | A | 12/1977 | Baudoin | |
|---|---|---|---|---|
| 6,629,515 | B1 * | 10/2003 | Yamamoto et al. | 123/179.4 |
| 7,266,441 | B2 * | 9/2007 | Shim | 701/112 |
| 7,438,042 | B1 * | 10/2008 | Kawada | 123/198 B |
| 2002/0116113 | A1 | 8/2002 | Kaneko | |

FOREIGN PATENT DOCUMENTS

| DE | 26 50 751 A1 | 5/1977 |
|---|---|---|
| DE | 102 11 462 C1 | 7/2003 |

* cited by examiner

*Primary Examiner* — Mahmoud Gimie
(74) *Attorney, Agent, or Firm* — Davis & Bujold, P.L.L.C.

(57) ABSTRACT

A method of operating a drivetrain of a motor vehicle. The drivetrain comprises a drive aggregate formed as a hybrid drive with a combustion engine and an electric machine, and a transmission connected between the drive aggregate and a drive output. The drivetrain also comprises a pressure reservoir system with at least one pressure reservoir and at least one pressure generator by the combustion engine in order to fill the pressure reservoir. A pressure in the pressure reservoir of the pressure reservoir system is measured and a value of the actual pressure, in the pressure reservoir system, is compared with at least one threshold value. When the actual pressure value is higher than a threshold value, stopping of the combustion engine is permitted, whereas if the actual pressure value is lower than the threshold value, stopping of the combustion engine is not permitted.

9 Claims, 1 Drawing Sheet

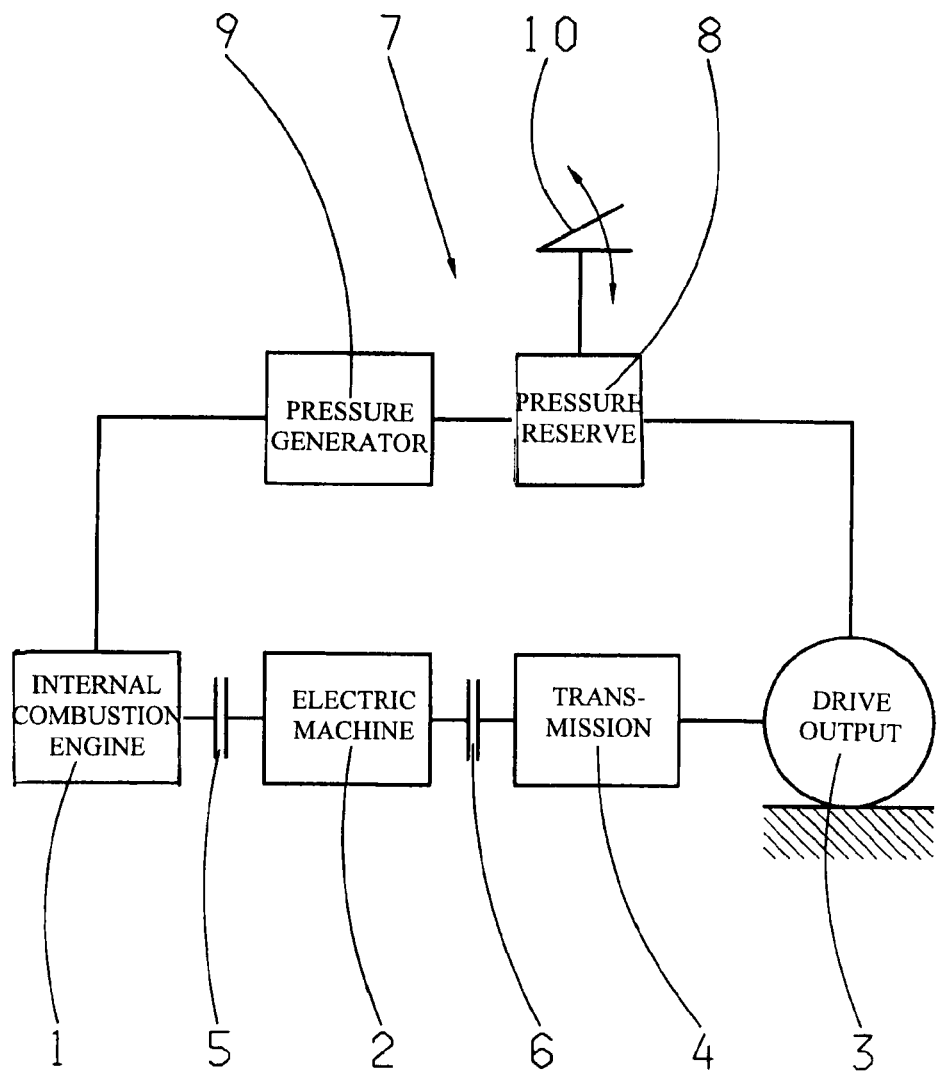

METHOD FOR TREATMENT OF A DRIVELINE

This application claims priority from German patent application serial no. 10 2009 001 034.3 filed Feb. 20, 2009.

FIELD OF THE INVENTION

The invention concerns a method for operating a drivetrain of a motor vehicle.

BACKGROUND OF THE INVENTION

The main components of a drivetrain of a motor vehicle are a drive aggregate and a transmission. The transmission converts rotation speeds and torques, and thereby determines the traction force provided by the drive aggregate and supplies it to a drive output of the drivetrain. The present invention concerns a method for operating a drivetrain which has as its drive aggregate a hybrid drive with an internal combustion engine and an electric machine.

From the prior art it is known that a drivetrain of a motor vehicle, in particular a drivetrain of a utility vehicle, comprises a pressure reservoir system with at least one pressure reservoir and at least one pressure generator such as a compressor for filling one or more of the pressure reservoir(s). In utility vehicles, for example, compressed air stored in pressure reservoir systems is released when a brake pedal is actuated to apply a braking torque at the drive output of the drivetrain. When compressed air is drawn from the pressure reservoir system, this reduces the pressure in the pressure reservoir system.

In drivetrains known in practice, which have a hybrid drive as drive aggregate and also a pressure reservoir system, the one or more pressure generators of the pressure reservoir system is powered by the internal combustion engine, namely in such manner that even during purely electric driving the internal combustion engine is also idling in order to drive the one or more pressure generators of the pressure reservoir system and so to maintain sufficient pressure in the pressure reservoir system.

This is disadvantageous from the standpoints of both unnecessarily high fuel consumption and increased production of emissions and noise.

SUMMARY OF THE INVENTION

Starting from the above, the present invention addresses the problem of providing a new type of method for operating a drivetrain of a motor vehicle. This problem is solved by a method according to the claims. According to the invention, the pressure in the one or more pressure reservoirs of the pressure reservoir system is measured and an actual pressure value of the pressure reservoir system is compared with at least one threshold value, so that when the actual pressure value is higher than the threshold value the internal combustion engine is allowed to stop, whereas if the actual pressure value is lower than the threshold value, stopping of the internal combustion engine is not allowed.

In the sense of the present invention, an actual pressure value of the pressure reservoir system is measured and compared with a threshold or limit value. Depending on this comparison, stopping or switching off the internal combustion engine is either allowed or permitted, or not allowed and not permitted.

The invention can be used in drivetrains having a hybrid drive of any design. Thus, the method according to the invention can be used in drivetrains whose hybrid drive is in the form of a parallel hybrid, or serial hybrid, or axial hybrid, or a power-branched hybrid. The pressure reservoir system is preferably a pneumatic pressure reservoir system that can be used for any purpose, such as supplying brake pressure or actuating an automatic or automated transmission. The pressure reservoir system can also be a hydraulic pressure reservoir system.

BRIEF DESCRIPTION OF THE DRAWING

Preferred further developments of the invention emerge from the claims and from the description given below. An example embodiment of the invention, to which it is not limited, is explained in more detail with reference to the drawing, which shows:

The sole FIGURE is an example of a block diagram representing the drivetrain of a motor vehicle, in which the method according to the invention for operating a drivetrain can be used

DETAILED DESCRIPTION OF THE PREFERRED EMBODIMENTS

The sole FIGURE diagrammatically shows the layout of a motor vehicle drivetrain, whose drive aggregate is a hybrid drive comprising an internal combustion engine 1 and an electric machine 2. Connected between the hybrid drive and the drive output 3 there is a transmission 4.

In the drivetrain layout shown in the sole FIGURE, a clutch 5 is arranged between the internal combustion engine 1 and the electric machine 2, and a clutch 6 is arranged between the electric machine 2 and the transmission 4. Thus, the drivetrain of the sole FIGURE is a so-termed parallel hybrid drivetrain. When the clutch 5 in the drivetrain of the sole FIGURE is disengaged, the internal combustion engine 1 is decoupled from the drive output 3. In contrast, when the clutch 5 is engaged the internal combustion engine 1 is coupled to the drive output 3. The clutch 6 is a transmission-external starting element. Instead of the transmission-external starting element 6 a transmission-internal starting element can also be used.

Already at this point it should be said that the invention is not limited to use in a parallel hybrid drivetrain as shown in the sole FIGURE. The invention can also be used in the same way in drivetrains which, for example, have a serial hybrid, axial hybrid or power-branched hybrid drive aggregate.

As shown in the sole FIGURE, the drivetrain also has a pressure reservoir system 7 comprising at least one pressure reservoir 8 and at least one pressure generator 9, in particular a compressor. With the help of the one or more pressure generator(s) 9 the one or more pressure reservoirs 8 of the pressure reservoir system 7 can be filled, and the one or more pressure generators 9 is powered by the internal combustion engine of the hybrid drive.

The pressure reservoir system 7 is preferably a pneumatic pressure reservoir system which, when a brake pedal 10 is actuated, supplies a braking torque at the drive output 3. It should be mentioned that the invention can also be used if the pressure reservoir system 7 is a hydraulic pressure reservoir system. Furthermore, the pressure stored in the pressure reservoir system 7 is not restricted to producing a braking torque at the drive output 3, but can also be used for actuating the transmission 4.

In the context of the present invention a pressure, existing in the one or more pressure reservoirs 8 of the pressure reservoir system 7, is measured and from this an actual pressure value in the pressure reservoir system 7 is determined. The actual pressure value of the pressure reservoir system 7 is compared with at least one threshold value, and if the actual pressure value of the pressure reservoir system 7 is higher than a threshold value, stopping or switching off the internal combustion engine 1 is permitted, whereas if the actual pressure value of the pressure reservoir system 7 is lower than a threshold value, stopping or switching off the internal combustion engine 1 is not permitted. And when stopping or switching off the internal combustion engine 1 of the drivetrain in the sole FIGURE is permitted, it is decoupled from the drive output 3 by disengaging the clutch 5.

Accordingly, in the context of the present invention it is necessary to measure the pressure in the pressure reservoir system 7 and compare it with a threshold or limit value. Depending on the comparison, stopping or switching off the internal combustion engine 1 is allowed or not allowed.

According to an advantageous further development of the present invention, regardless of whether the motor vehicle is at rest or driving, the actual pressure value of the pressure reservoir system 7 is compared with a first threshold value and if the actual pressure value is higher than this first threshold value, stopping of the internal combustion engine 1 is permitted, whereas if the actual pressure value is lower than the first threshold value, stopping or switching off the internal combustion engine 1 is not permitted.

When the motor vehicle is at rest, the actual pressure value in the pressure reservoir system 7 is then preferably also compared with a second threshold value, and if the actual pressure in the pressure reservoir system 7 is higher than the second pressure value, stopping or switching off the internal combustion engine 1 is permitted, whereas if the actual pressure in the pressure reservoir system 7 is lower than the second threshold value, stopping or switching off the internal combustion engine 1 is not permitted. In this case the second threshold value is lower than the first threshold value.

If the motor vehicle is driving in a recuperative operating mode, the actual pressure in the pressure reservoir system 7 is preferably also compared with a third threshold value, and if the actual pressure in the pressure reservoir system 7 is higher than this third threshold value, stopping or switching off the internal combustion engine 1 is permitted, whereas if the actual pressure is lower than the third threshold value, stopping or switching off the internal combustion engine 1 is not permitted.

Recuperative operation means that braking is carried out with the help of an electric machine 2 of the drive aggregate operated as a generator, and not by means of the service brakes which may need to draw compressed air from the pressure reservoir system 7. The third threshold value, again, is lower than the first threshold value.

It is preferably also provided that when the motor vehicle is at rest and the internal combustion engine 1 is switched off, if the actual pressure in the pressure reservoir system 7 is higher than a fourth threshold value, the motor vehicle can be started under purely electric-motor power with the internal combustion engine 1 switched off. But if the actual pressure in the pressure reservoir system 7 is lower than the fourth threshold value, the internal combustion engine 1 is started in order to start the motor vehicle. When the actual pressure value is higher than the fourth threshold value, a purely electric motor powered starting of the motor vehicle is permitted, during driving under purely electric motor power the speed of the electric machine 2 is monitored, and when the speed of the electric machine 2 has fallen to a certain minimum speed the internal combustion engine 1 is started. In this case the fourth threshold value is higher than the first threshold value.

Using the method according to the invention it is possible to make the stopping or switching off of an internal combustion engine 1 of a hybrid drivetrain depend on whether or not a pressure reservoir system 7 of the drivetrain requires the operation of the internal combustion engine 1. This enables the consumption, emissions and noise of the internal combustion engine 1 to be reduced.

INDEXES

1 Internal combustion engine
2 Electric machine
3 Drive output
4 Transmission
5 Clutch
6 Clutch
7 Pressure reservoir system
8 Pressure reservoir
9 Compressor
10 Brake pedal

The invention claimed is:

1. A method of operating a drivetrain of a motor vehicle, the drivetrain comprising a drive aggregate formed as a hybrid drive comprising an internal combustion engine and an electric machine, and a transmission being connected between the drive aggregate and a drive output, the drivetrain also comprises a pressure reservoir system with at least one pressure reservoir and at least one pressure generator which is powered by the internal combustion engine, by which the at least one pressure reservoir is filled, the method comprising the steps of:

ascertaining whether the motor vehicle is either driving or stationary;
measuring an actual pressure in the at least one pressure reservoir of the pressure reservoir system;
comparing a value of the actual pressure in the pressure reservoir system with a first threshold value, if the motor vehicle is driving;
comparing the value of the actual pressure in the pressure reservoir system with a second threshold value, if the motor vehicle is stationary;
defining the second threshold value as being lower than the first threshold value;
when the motor vehicle is driving and the value of the actual pressure is higher than the first threshold value, permitting stopping of the internal combustion engine;
when the motor vehicle is driving and the value of the actual pressure is lower than the first threshold value, preventing stopping of the internal combustion engine;
when the motor vehicle is stationary and the value of the actual pressure is higher than the second threshold value, permitting stopping of the internal combustion engine; and
when the motor vehicle is stationary and the value of the actual pressure is lower than the second threshold value, preventing stopping of the internal combustion engine.

2. The method according to claim 1, further comprising the step of, when the motor vehicle is stationary and the internal combustion engine is switched off, comparing the value of the actual pressure with a fourth threshold value, and, if the value of the actual pressure is higher than the fourth threshold value, initiating driving of the motor vehicle solely with power from the electric motor.

3. The method according to claim 2, further comprising the step of, if the value of the actual pressure is lower than the fourth threshold value, starting the internal combustion engine prior to the motor vehicle.

4. The method according to claim 2, further comprising the step of monitoring a speed of the electric motor while driving the motor vehicle solely with the power of the electric motor and starting the internal combustion engine when the speed of the electric machine reaches a certain minimum speed.

5. The method according to claim 2, further comprising the step of defining the fourth threshold value higher than the first and the second threshold values.

6. The method according to claim 1, further comprising the step of, when the motor vehicle is operating in a recuperative mode, comparing the value of the actual pressure with a third threshold value;
   if the value of the actual pressure is higher than the third threshold value permitting stopping of the internal combustion engine; and
   if the value of the actual pressure is lower than the third threshold value, preventing stopping of the internal combustion engine.

7. The method according to claim 6, further comprising the step of defining the third threshold value as being lower than the first threshold value.

8. The method according to claim 6, further comprising the step of operating the motor vehicle in the recuperative mode by at least partially braking the drive aggregate via operation of the electric machine as a generator.

9. A method of operating a drivetrain of a motor vehicle, the drivetrain comprising a drive aggregate formed as a hybrid drive comprising an internal combustion engine and an electric machine, and a transmission being connected between the drive aggregate and a drive output, the drivetrain also comprises a pressure reservoir system with at least one pressure reservoir and at least one pressure generator which is powered by the internal combustion engine, by which the at least one pressure reservoir is filled, the method comprising the steps of:
   determining whether the motor vehicle is either driving or stationary;
   determining whether the combustion engine is switched off, if the motor vehicle is stationary and determining whether the electric machine is operating as a generator and braking the motor vehicle, if the motor vehicle is driving;
   measuring an actual pressure in the at least one pressure reservoir of the pressure reservoir system;
   if the motor vehicle is driving, comparing the actual pressure with a first threshold pressure value and either permitting switching off of the combustion engine, if the actual pressure is higher than the first threshold pressure value or preventing switching off of the combustion engine, if the actual pressure is lower than the first threshold pressure value;
   if the motor vehicle is driving and the electric machine is operating as the generator and braking the motor vehicle, comparing the actual pressure with a third threshold pressure value and either permitting switching off of the combustion engine, if the actual pressure is higher than the third threshold pressure value or preventing switching off of the combustion engine, if the actual pressure is lower than the third threshold pressure value;
   if the motor vehicle is stationary, comparing the actual pressure with a second threshold pressure value and either permitting switching off of the combustion engine, if the actual pressure is higher than the second threshold pressure or preventing switching off of the combustion engine, if the actual pressure is lower than the second threshold pressure value;
   disengaging a clutch located between the combustion engine and the electric machine to decouple the combustion engine and the electric machine when switching off the combustion engine;
   if the motor vehicle is stationary and the combustion engine is switched off, comparing the actual pressure with a fourth threshold pressure value and either starting motor vehicle driving with the electric machine alone, if the actual pressure is higher than the fourth threshold pressure value or starting motor vehicle driving with the combustion engine, if the actual pressure is lower than the fourth threshold pressure value;
   monitoring a speed of the electric motor while driving the motor vehicle with the electric motor alone and starting the internal combustion engine when the speed of the electric machine reaches a certain minimum speed; and
   defining the fourth threshold pressure value as being higher than the first threshold pressure value which is higher than the second and the third threshold pressure values.

* * * * *